US007277718B2

(12) United States Patent
Wong

(10) Patent No.: US 7,277,718 B2
(45) Date of Patent: Oct. 2, 2007

(54) METHODS AND APPARATUS FOR FORMATTING INFORMATION FOR A COMMUNICATION

(75) Inventor: Gregory Alan Wong, Mercer Island, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 505 days.

(21) Appl. No.: 10/199,100

(22) Filed: Jul. 22, 2002

(65) Prior Publication Data

US 2004/0203648 A1     Oct. 14, 2004

(51) Int. Cl.
*H04Q 7/20*     (2006.01)
(52) U.S. Cl. .................... 455/466; 455/414.2; 455/566; 707/104.1
(58) Field of Classification Search ............. 455/414.1, 455/414.2, 414.3, 414.4, 418–420, 566, 69, 455/466, 412.2; 707/10, 104.1
See application file for complete search history.

(56) References Cited

U.S. PATENT DOCUMENTS

| | | | |
|---|---|---|---|
| 6,223,039 B1* | 4/2001 | Holm et al. ............. | 455/435.2 |
| 6,304,523 B1* | 10/2001 | Jones et al. ............... | 707/104.1 |
| 6,741,853 B1* | 5/2004 | Jiang et al. ................. | 455/418 |
| 6,950,823 B2* | 9/2005 | Amiri et al. .................. | 707/10 |
| 2002/0086706 A1* | 7/2002 | Chen et al. ................. | 455/560 |
| 2003/0084321 A1* | 5/2003 | Tarquini et al. ............ | 713/200 |
| 2003/0191802 A1* | 10/2003 | Zhao et al. ................. | 709/203 |
| 2004/0203851 A1* | 10/2004 | Vetro et al. .............. | 455/456.1 |
| 2004/0203854 A1* | 10/2004 | Nowak ..................... | 455/456.1 |

* cited by examiner

*Primary Examiner*—Gerald Gauthier
(74) *Attorney, Agent, or Firm*—Coulter C. Henry, Jr.; Parks Knowlton LLC; Paul E. Knowlton, Esq.

(57) ABSTRACT

The invention provides an apparatus and method for formatting information for a communication. The apparatus has an interface to receive an identifier that identifies at least one physical property or capability of a communication device or an identifier that identifies at least one service to be provided to the user of the communication device, and further includes a controller that formats information to be sent to the communication device based on the identified physical property or capability of a communication device or based on the identified service to be provided to the user of the communication device.

19 Claims, 4 Drawing Sheets

METHODS AND APPARATUS FOR FORMATTING INFORMATION FOR A COMMUNICATION

BACKGROUND OF THE INVENTION

1. Field of Invention

This disclosure is directed to a method and apparatus for formatting information for communication.

2. Description of Related Art

Currently, the number of wireless communication devices that are being used by the population at large is rapidly increasing. For example, wireless communication devices are quickly gaining popularity as the cost of such devices become more and more economical, while at the same time the fees for wireless services continue to decrease. As a result, an increasing number of people are resorting to wireless communication devices as their primary manner of communication due to the accessibility and portability associated with such devices.

Partly in response to the ever increasing market share, recent advancements in telecommunication technologies have increased the number of features and capabilities of wireless communication devices. For example, it is common to find a cellular phone with a Short Message Service (SMS) feature and having wireless access to the Internet. Further, by using protocols defined by organizations, such as Wireless Application Protocol (WAP) Forum, $3^{rd}$ Generation Partnership Project (3GPP), currently cellular phone user can "surf" through the Internet for information or simply gain access to their various accounts. Another popular wireless communication device, the wireless hand-held computer, provides many, if not all the features of a regular desktop computer, and yet provides mobility to its user.

SUMMARY OF THE INVENTION

As a result of the numerous capabilities, features and services available to the wireless communication device, it can be difficult for a service provider to optimize these capabilities and features. For example, service providers can experience difficulty in sending correctly formatted information to the wireless communication device without prior knowledge of the device's capabilities and features. Further, as a user switches from one device to another, it can be difficult for a service provider to provide the user with services that the user subscribes to in a format best suited for a particular communication device. While the device user is capable of updating their corresponding device information with the service provider, in many instances the user neglects to do so. As a result, the service provider can send information to the user's device in a format that will not optimize the device's capabilities and features.

The present invention provides an apparatus and method for formatting information for a communication. In various embodiments, the apparatus can include an interface to receive an identifier that identifies at least one physical property or capability of a communication device, and can further include a controller that formats information to be sent to the communication device based on the identified physical property of a communication device. In various embodiments, the interface can receive another identifier that identifies at least one service available to a user of the communication device. The controller can then format the information to be sent to the communication device based on the identified physical property of the communication device and the service available to the user of the communication device. Accordingly, information can be transmitted to a user in a format that is best suited to a particular device.

These and other features and advantages of this invention are described in greater detail or are apparent from the following description of the preferred embodiments.

BRIEF DESCRIPTION OF THE DRAWINGS

The present invention will be described with reference to the accompanying drawings, wherein like numerals designate like elements, and wherein.

DETAILED DESCRIPTION OF PREFERRED EMBODIMENTS

Figure 1:
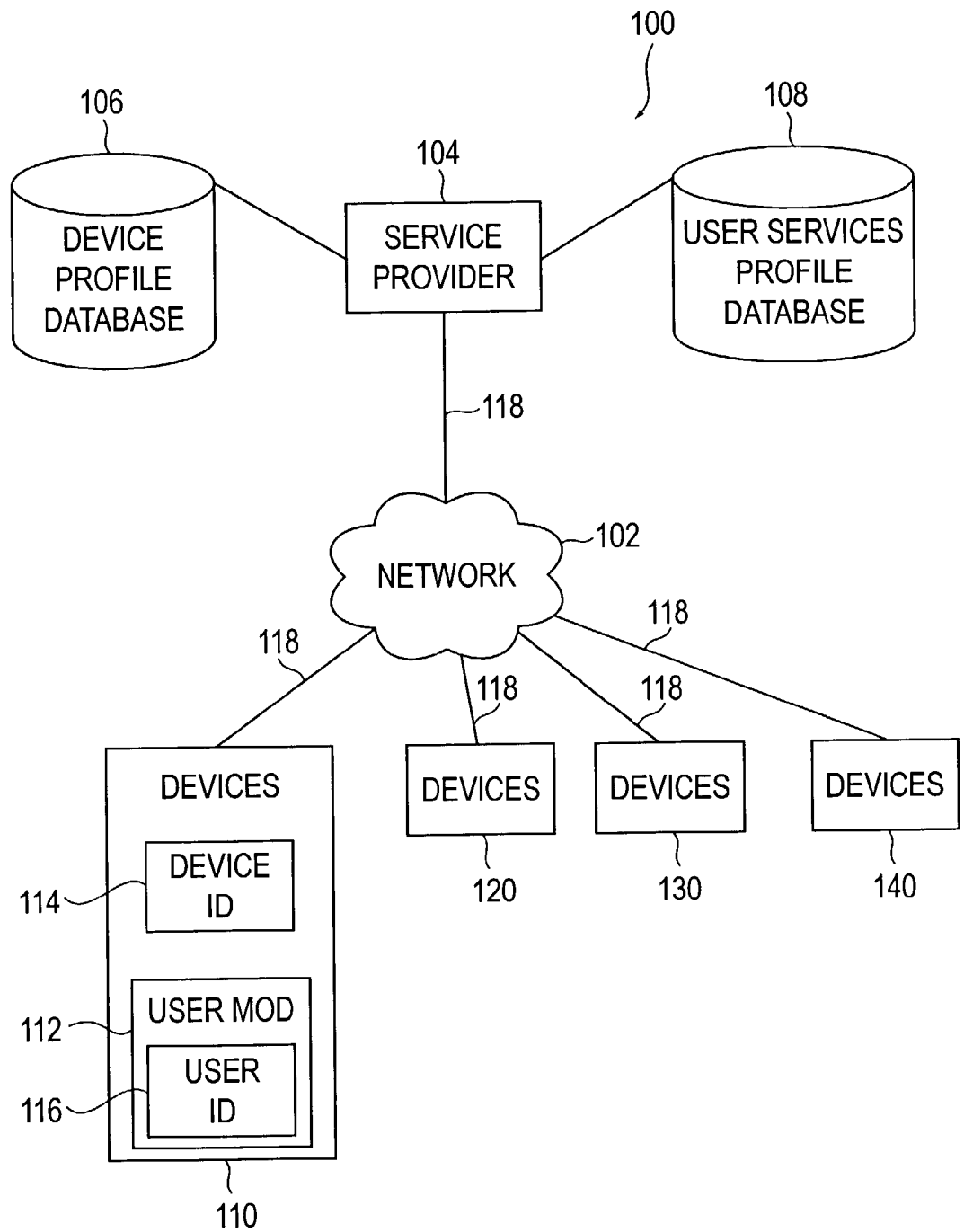
FIG. 1 is an exemplary block diagram of a system according to an embodiment of the present invention.

FIG. 1 shows an exemplary block diagram of a communication system 100 that includes a network 102, a service provider 104 coupled to a network 102, a device profile database 106 and a user services profile database 108. Additionally, a plurality of communication devices 110, 120, 130 and 140 are connected with the network 102 via communication links 118.

The network 102 can be wired, wireless or a combination of the two. The wireless network can be a cellular network, a satellite communication network, wireless local area network (WLAN), and the like. For example, the wireless network can be the Global System for Mobility (GSM) network. In one embodiment, the wireless network may include a wireless communication receiving center that performs the switching of communication between the communication devices 110, 120, 130, 140 and/or between the communication devices 110, 120, 130, 140 and the service provider 104, as well as management of communication services such as authentication.

The network 102 may further be a single network or a plurality of networks of the same or different types. For example, the network 102 may include a local telephone network in connection with a long distance telephone network. Further, the network 102 may be a data network or a telecommunications or a video distribution (e.g., cable, terrestrial broadcast, or satellite) network in connection with a data network. Any combination of telecommunications, video/audio distribution and data networks, whether a global, national, regional, wide-area, local area, or in-home network, may be used without departing from the spirit and scope of the present invention. For the purpose of the following discussion, it will be assumed that the network 102 is a single integrated voice, video and data network, that is either wired or wireless or combinations thereof.

The devices 110, 120, 130 and 140 and service provider 104 are in communication with the network 102 over communication links 118. These communication links 118 may be any type of connection that allows for the transmission of information. Some examples include conventional telephone lines, digital transmission facilities, fiber optic lines, direct serial/parallel connections, cellular phone connections, satellite communication links, local area networks (LANs), intranets, and the like. For the purposes of discussion, it will be assumed that communication links 118 connecting at least devices 110, 120, 130 and 140 are wireless communication links, such as cellular telephone connections.

The communication devices 110, 120, 130 and 140 can be devices of any type that allow for the transmission and/or reception of communication signals, as well as permit a subscriber to connect to and use a network's capacity, features and services. For example, the communication devices 110, 120, 130 and 140 can include a telephone, a wireless telephone, a cellular phone, a phone with Internet access capabilities, such as a Wireless Access Protocol (WAP) phone, a Personal Digital Assistant (PDA), a handheld computer, a wireless terminal, a pager and any other devices capable of sending and/or receiving data. Communication devices 110, 120, 130, and 140 may be well-known mobile communication devices that typically contain an antenna coupled to a transceiver, a processor or controller coupled to memory for storing instructions or programs, a keypad, touchpad or microphone for accepting input from a user, and a display or speaker for providing information to a user.

Service provider 104 is a device that is capable of providing service to users of devices 110, 120, 130 and 140. Further, the service provider 104 is coupled to the device profile database 106 and the user services profile database 108 in order to look up both device characteristics and user services, and to ultimately format transmissions to the devices. Although service provider 104 and databases 106 and 108 are discussed primarily as external or "add-on" elements to network 102, it should be noted that any or all of them can also be an internal element of network 102. For example, an external service provider 104 may request information from a device profile database internal to the network 102, perhaps through an Application Programming Interface (API) at the interface to network 102.

For example, if a user that subscribes to internet access is using device 120 and the device 120 is a personal digital assistant (PDA) capable of displaying high resolution gray scale images, then the service provider 104 can transmit high resolution black and white web site images to the device 120. Subsequently, if the same user switches, for example to device 140 which is a cellular phone capable of only displaying textual information, then the service provider 104 can still provide internet access, however, the data will be formatted to only of a textual nature.

As an example of operation, a communication device, such as the communication device 110, can initiate communication with the service provider 104 via the network 102. Upon a request to initiate service, the service provider 104 requests and receives at least one of a device identifier 114 and a user identifier 116 which is used by the service provider 104 to search the device profile database 106 and/or the user services profile database 108, respectively. Once a particular device and service profile is determined, the service provider 104 can customize communication with the communication device.

As shown with respect to communication device 110, the communication devices can include identifying information of the device itself, as well as the user of the communication device 110. The identifying information can be used by the service provider 104 to track the use and provide proper service and features to the user of the communication device 110 which correspond to the device, as well as the particular user. Such identifying information can be permanently stored within the communication device 110 itself, or can also be temporarily stored on the communication device 110.

For example, the identifying information of the communication device 110 can be permanently stored within a memory of the communication device 110 since the identifying information of the communication device will usually not change during the life of the device. However, the communication device may be used by numerous users, and therefore the identifying information of each user may change quite often. Accordingly, by knowing the identifying information of the communication device 110, and the user of the communication device 110, a service provider 104 can accurately provide service and features to the user that are targeted to the capabilities of the communication device 110.

To store the identifying information, the communication device 110 may include one or more controllers, such as digital signal processors (DSPs), a memory, a radio transceiver if the communication device 110 is wireless, a display and a removable user identifier module 112. According to one embodiment, the user identifier module 112 may be a subscriber identity module (SIM). The user identifier module 112 may include the user identifier 116 that identifies the user, a secret key that is used for authenticating communication, and other user information. Information contained in the user identifier module 112 may be protected against unauthorized use by using a password, a personal identity number (PIN), an encryption/decryption algorithm or any other security measures. The user identifier module 112 allows a user to have access to services that the user subscribes to via a communication device 110, irrespective of the location of the device or the use of a specific communication device 110. For example, by inserting the user identifier module 112 from communication device 110 to the communication device 120 the user is able to transmit/receive communication and/or receive subscribed services using the user identifier module 112 inserted communication device 120.

The communication devices 110, 120, 130 and 140 are uniquely identified by the device identifier 114. According to various embodiments, the device identifier 114 may be the International Mobile Equipment Identity (IMEI) or Electronic Serial Number (ESN). The device identifier 114 and the user identifier 116 are independent from each other in that the device identifier 114 identifies the physical properties or capabilities of the communication device 110, for example, color display, high/low resolution, processor speed, sound, communication rate, memory, operating system, currently loaded software, and the like, while the user identifier 116 identifies the services available to the user, for example, Internet, voicemail, videophone, three-way calling, call forwarding, and the like.

Figure 2:
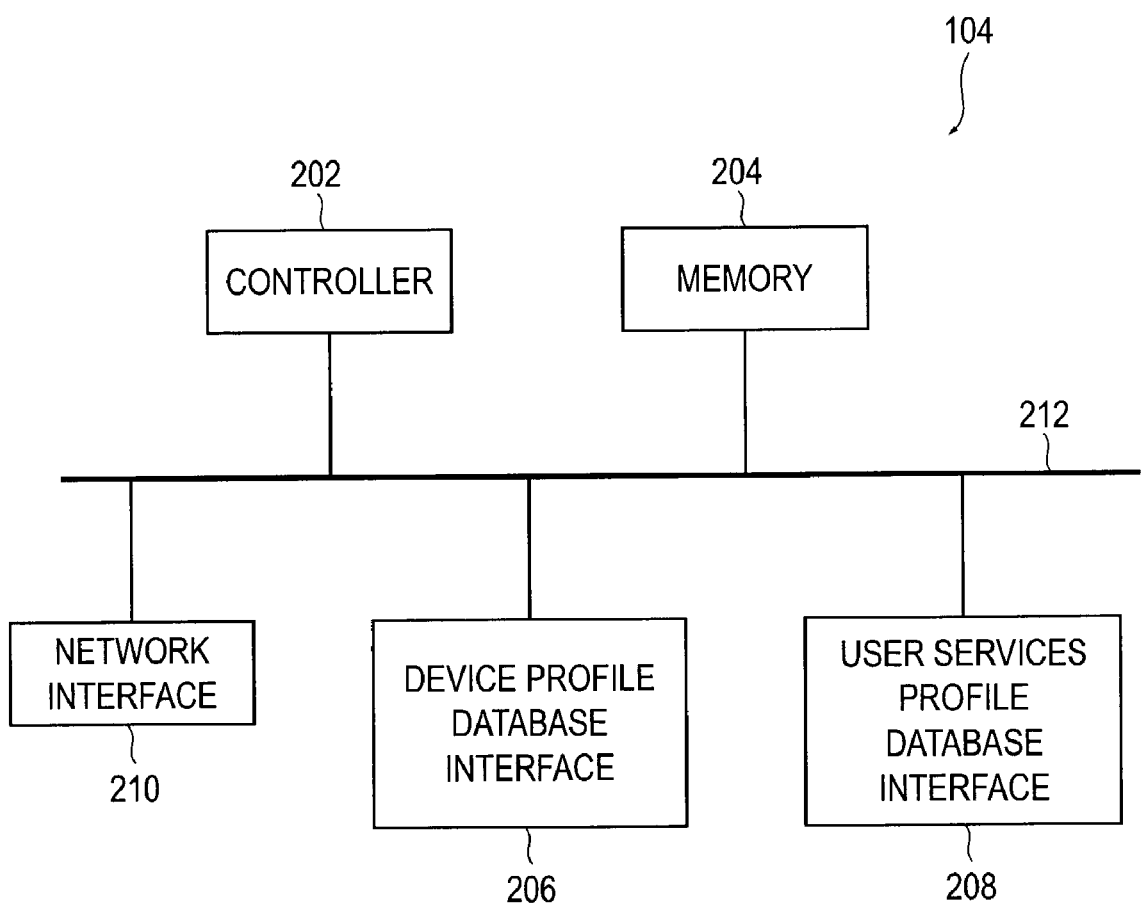
FIG. 2 is an exemplary block diagram of a service provider according to an embodiment of the present invention.

FIG. 2 is an exemplary block diagram of the service provider 104 which can include a controller 202, a memory 204, a device profile database interface 206, a user services profile database 208 and a network interface 210. In the shown embodiment, the above components are coupled together through a signal bus 212, although other computer architectures may be used.

The service provider 104 is coupled to the network 102 through the network interface 210. The service provider 104 may be a single server coupled to the network 102 or it may be representative of one of the many servers distributed throughout the network 102 that operate cooperatively with each other. Any configuration that permits the formatting of information for a communication with a communication device 110, 120, 130 and 140 may be used without departing from the present invention.

The controller 202 can receive the information contained in the device identifier 114 and the user identifier 116 of the communication device 110 from the wireless communication receiving center when the wireless communication receiving center initiates communication with the service provider 104. Alternatively, the controller 202 receives the device identifier 114 from the wireless communication receiving center and when the communication device 110 is in communication with the service provider 104, the user identifier 116 of the communication device 110 is requested by the controller 202. Alternatively, when the communication device 110 is in communication with the service provider 104, the device identifier 114 and the user identifier 116 of the communication device 110 is requested by the controller 202. The received device identifier 114 and the user identifier 116 allows the controller 202 to autonomously gain information about the communication device 110 and its user. Even if the device identifier 114 and the user identifier 116 are not received in real time, it is useful to forward the information to the controller 202 so that in subsequent communication the controller 202 can determine the capabilities and features of the communication device 110 and the services available to the user.

Once the controller 202 has obtained the device and user identifier information, the controller 202 can search both the device profile database 106 and the user services profile database 108 using the service profile database interface 206 and the user services profile database interface 208, respectively. Once a match is located, the controller 202 can retrieve the physical properties of the communication device 110 from the device profile database 106 using the device identifier information and similarly retrieve the services available to the user from the user services profile database 108 using the user identifier information. If the controller 202 does not find the pertinent information in the respective device profile database 106 and the user services profile database 108 the controller 202 can use the network interface 210 to search the databases of other servers and/or resources that are in communication with the service provider 104. If nothing further is found, then the controller 202 may use the last known setting for the device or user, if known. Alternatively, the controller 202 may use a predetermined default setting. If the pertinent information is found in the other servers and/or resources, the controller 202 can retrieve the information and create a record which can be stored in the respective device profile database 106 and the user services profile database 108 for future use. Alternatively, if the device identifier is unknown to the device profile database(s) 106, the controller 202 may request the pertinent device capabilities from the device 110 and use that information to create a new record in the device profile database(s) 106.

With the information of the physical properties of the communication device 110 and the services available to the user, the service provider 104 can format or present information to the user in a format that optimizes the user's communication device 110 and/or services. Since the physical properties of the communication device 110 and the services available to the user vary in form, factor, display and capability, the service provider 104 adapts the information communicated to the communication device 110 based on the physical properties of the communication device 110 and the services available to the user.

As an example, SMS is currently the primary mechanism for sending messages. However, due to advancements in telecommunication technologies the messaging mechanism is being updated. Certain communication device manufacturers have adapted the 3GPP Enhanced Messaging Service (EMS) standard, while other vendors have decided to use other messaging services, such as Nokia Smart Messaging. Since these two formats are incompatible, efficiency of message delivery can be compromised if the service provider is not able to determine what format the communication device uses, as well as the services available to the current user of the device.

Figure 3:
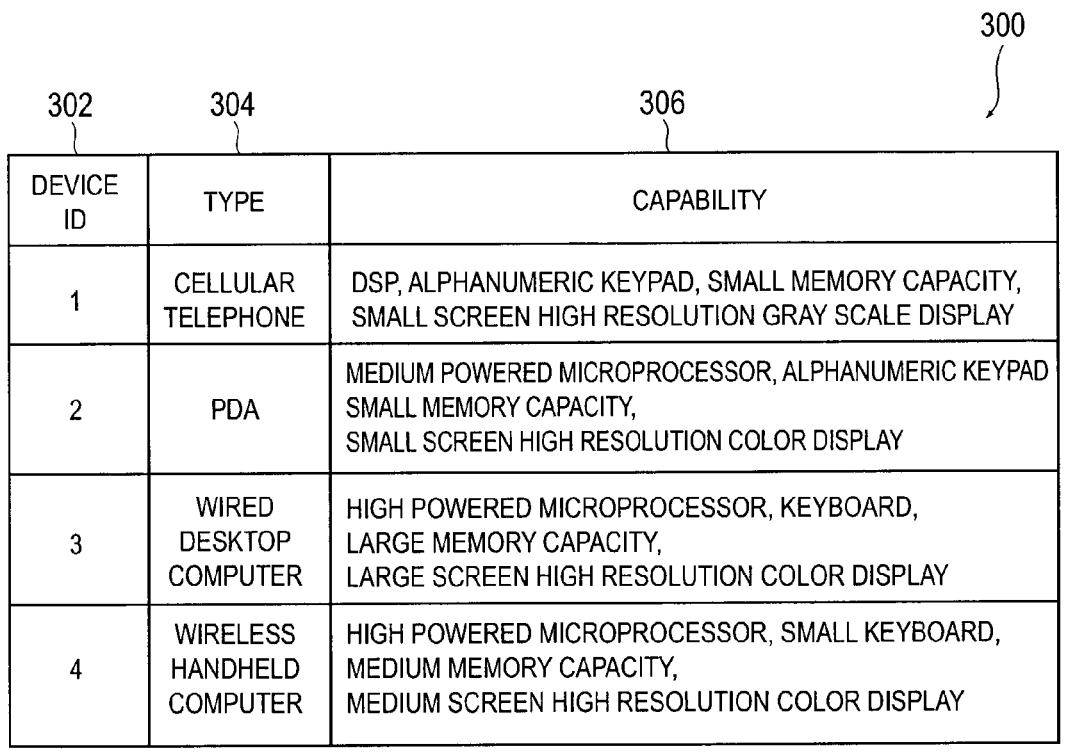
FIG. 3 is an exemplary data structure for storing device profile according to device identifier.
Figure 4:
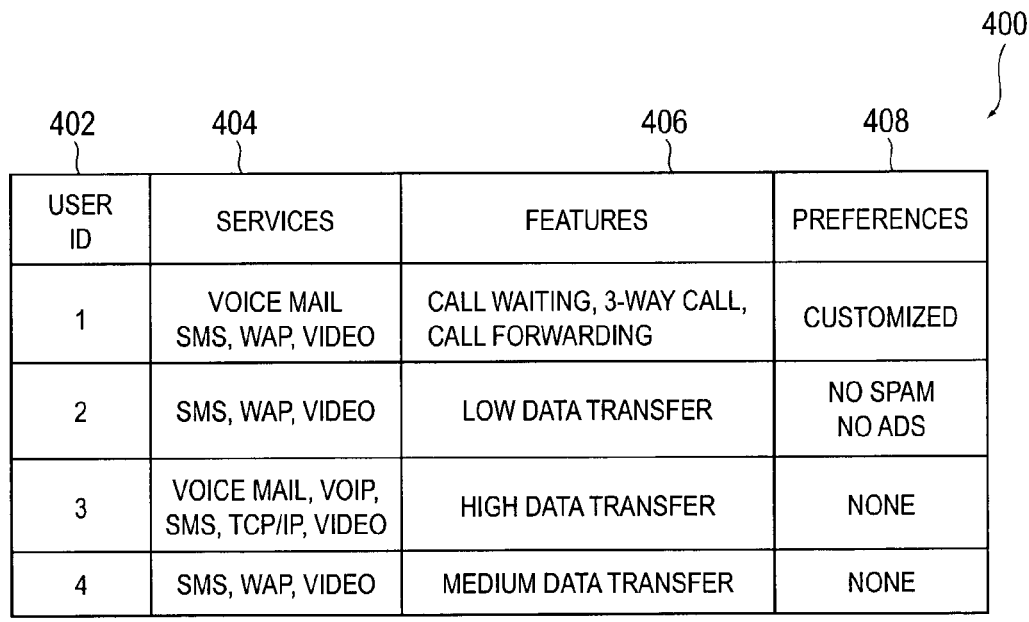
FIG. 4 is an exemplary data structure for storing user services profile according to user identifier.

FIGS. 3 and 4 show exemplary data structures 300 and 400 for storing data in the device profile database 106 and the user services profile database 108, respectively. It should be understood that there exists numerous methods for storing and organizing such information. For example, the data structures 300 and 400 may be combined into one data structure. Accordingly, the following example should not be understood to be limiting in any way.

FIG. 3 shows an exemplary data structure 300 for storing device profile information. The data structure 300 includes field 302 for storing device identifiers that are used to identify each communication device 110, 120, 130 and 140, coupled with the communication network 102. In one embodiment, for example, the device identifier can be the IMEI.

The data structure 300 further includes fields 304, 306 for storing device information corresponding to the communication device 110, 120, 130 and 140, which are identified as Device ID 1, Device ID 2, Device ID 3 and Device ID 4, respectively. Field 304 corresponds to the type of the communication devices. For example, the Device ID 1 may be a cellular telephone, Device ID 2 may be a PDA, Device ID 3 may be a wired desktop computer, and Device ID 4 may be a wireless handheld computer.

Field 306 corresponds to the capabilities of the communication devices. For example, the Device ID 1 may have a DSP, an alphanumeric keypad, a small memory capacity and a small screen high resolution grayscale display; Device ID 2 may have a medium powered microprocessor, an alphanumeric keypad, a medium memory capacity and a medium screen high resolution color display; Device ID 3 may have a high powered microprocessor, a keyboard, a large memory capacity and a large screen high resolution color display; and Device ID 4 may have a high powered microprocessor, a small keyboard, a medium memory capacity and a medium screen high resolution color display. As described above, the capabilities of the communication devices generally remain constant during the life of the device, and therefore, fields 304 and 306 normally will never change. However, a communication device can be upgraded, reconfigured and/or altered, such that the device's corresponding data in fields 304 and 306 may need to be changed. Additionally, if a device can operate in one or more modes, the data fields should be updated accordingly, based on the selected mode.

FIG. 4 shows an exemplary data structure 400 for storing services available to the user. The data structure 400 includes field 402 for storing user identifiers corresponding to user identifier modules. As described above, the user identifier modules may be located in the communication devices 110, 120, 130 and 140. For example, in one embodiment the user identifier may be the IMSI.

The data structure further includes fields 404, 406 and 408 for storing service information corresponding to the service identifier. In one embodiment, the fields 404, 406, 408 correspond to services, features and preferences, respectively. For example User ID 1 may have voice mail, SMS, WAP and video as services, call waiting, three-way call and call forwarding as features, and certain customized preferences; User ID 2 may have SMS, WAP and video as services, low data transfer rate as a feature, and no spam and no advertisements as preferences; User ID 3 may have voice mail, voice on internet protocol (VoIP), SMS, TCP/IP and video as services, high data transfer rate as a feature, and no preferences; and User ID 4 may have SMS, WAP and video as services, medium data transfer rate as feature, and no preferences.

As an example of operation, assume that the user has activated device 110 for a communication across the network 102. Upon activation, the device 110 can read the device ID 114 stored in the memory of the communication device 110, and transmit the information to the service provider 104. Further, prior to activation, the user can insert a memory card having a user ID 116 thereon into the user identification module 112. The user ID of the user can then be read by the device 110, and also transmitted to the service provider 104.

During an initial portion of the activation, the above information can be received by the service provider 104. Based on the device ID and the user ID, the service provider 104 can search both the device profile database 106 and the user services profile database 108, respectively, in order to determine a proper format for communicating data with a communication device 110. For example, referring to FIGS. 3 and 4, and assuming that the device ID is 2 and the user ID is 2, then the device is a PDA having a medium powered microprocessor, alphanumeric keypad, a small memory capacity and a small screen high resolution color display. Further, the user having user ID 2, subscribes to SMS, WAP, and video services, while the user uses a low data transfer rate. Accordingly, the service provider 104 can transmit data to the device 110 (PDA) in a video format, such as streaming video at a low data rate.

For example, prior to activation of the communication device, messages could have been received and stored by the service provider 104 for the user having user ID 2. The messages would have been received and saved in a video format by the service provider 104. Therefore, upon activation, the video format messages could be transmitted to the device 110 for playback in their video format.

On the contrary, if the communication device that the user was using did not include video capabilities, such as the case of a cellular telephone having only audio capabilities, only an audio portion of the video message would have been transmitted to the user. If the user subsequently changed to a communication device that was capable of receiving and displaying video, then the service provider 104 could then transmit the full message (both audio and video components) to the device for display.

Figure 5:
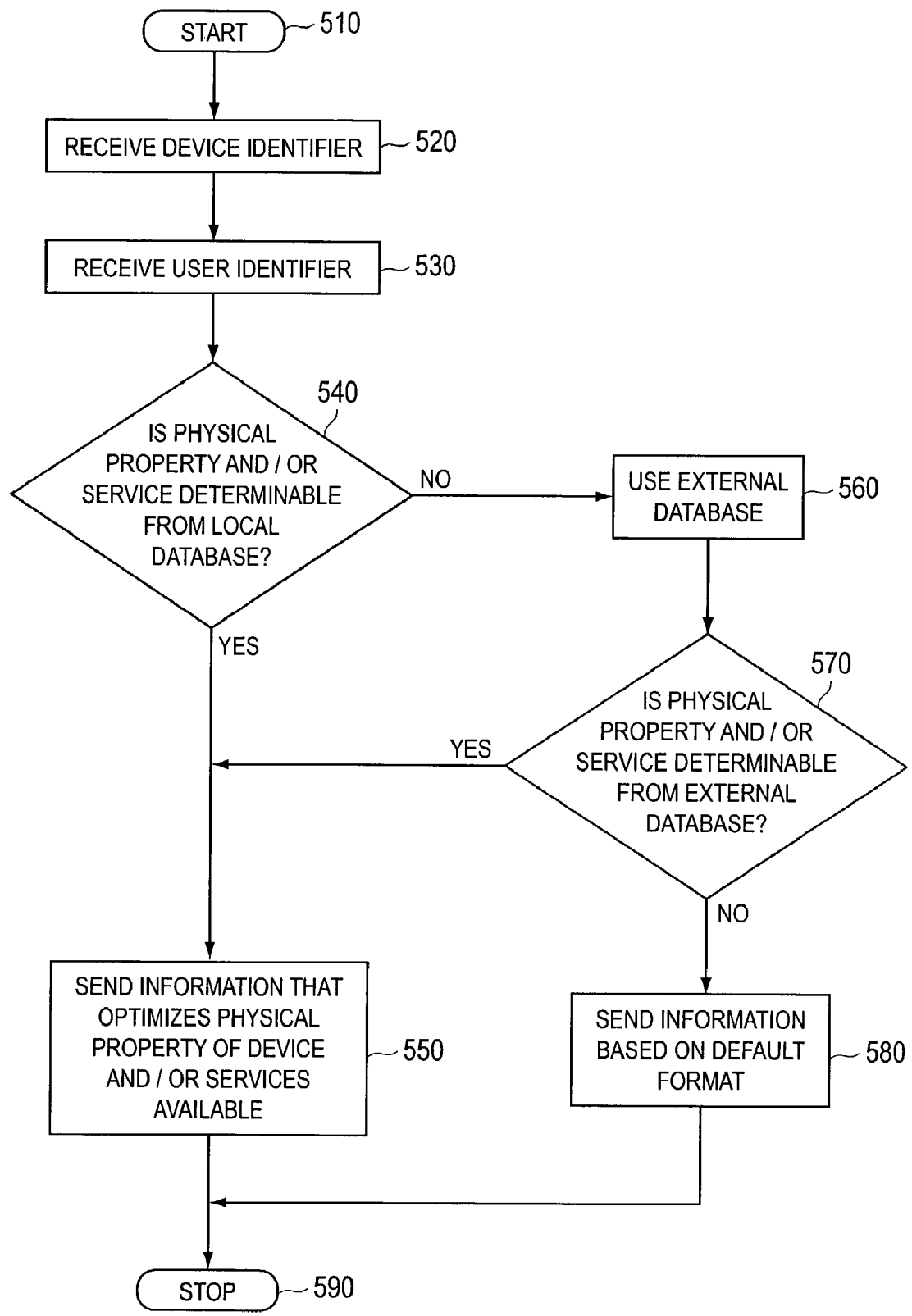
FIG. 5 is a flowchart outlining an exemplary operation of formatting information for a communication according to one embodiment of the invention.

FIG. 5 is an exemplary flowchart for formatting information for a communication according to an embodiment of the invention. The process begins at step 510 and continues to step 520 where a device identifier of a communication device is received. The device identifier of the communication device may be received from the communication device itself or from a secondary source such as a wireless communication receiving center.

The process continues to step 530 where a user identifier associated with the communication device is received. Similar to receiving the device identifier, the user identifier associated with the communication device may be received from the communication device itself or from a secondary source, such as the wireless communication receiving center.

In step 540 a determination is made as to whether the physical property of the communication device and the services available to the user can be retrieved from a local database using the received device identifier and user identifier, respectively. In an embodiment, both the physical property of the communication device and the services available to the user needs to be determined so that information sent to the communication device is optimized in terms of the capabilities and the features of the communication device and the services available to the user. In an alternative embodiment, the determination of physical property of the communication device is sufficient since the optimization of the communication device's capabilities and features are desired.

If the local database is able to provide one or more of the data described above, dependent on the embodiment implemented, the process continues to step 550. In step 550 the format or presentation of the information to be sent to the communication device is determined based on the physical property of the communication device and the services available to the user. In an alternative embodiment, the format or presentation of the information to be sent to the communication device is determined based on the physical property of the communication device.

Otherwise, in step 540, if the local database is not able to provide one or more of the data described above, dependent on the embodiment implemented, the process continues to step 560. In step 560 external databases such as the databases of other servers or resources are searched. The process then proceeds to step 570 where a determination is made as to whether the physical property of the communication device and the services available to the user can be retrieved from the external databases. If the external databases are able to provide one or more of the data described above, dependent on the embodiment implemented, the process continues to step 550. Otherwise, the process continues to step 580.

In step 580, and in the absence of specific formatting information, a default format or presentation of the information is transmitted to the communication device. Information is transmitted in the communication device in the format of step 550, or alternatively in the format of step 580, until the communication terminates in step 590.

As described above, the present invention relates to apparatus and method for formatting information for a communication. A method of this invention is preferably implemented on a programmed processor. However, the service provider can also be implemented on a general purpose or special purpose computer, a program microprocessor, a micro-controller, a peripheral integrated circuit element, an ASIC or other integrated circuit, a hardware electronic or logic circuit such as a discrete element circuit. A programmable logic device such as a PLD, PLA, FPGA, PAL or the like. In general, any device on which resides a finite state machine capable of implementing the flowchart shown in FIG. 5 can be used to implement the process of functions of this invention.

In various embodiments, information transmitted to a communication device can include advertisements, equipment upgrade opportunities and other information based on a profile of the communication device. For example, a service provider could determine that a user has "old" equipment and transmit a marketing advertisement that encourages the user to upgrade to a "new" equipment. In another example, a service provider could inform a user that a "flash upgrade" is needed on their equipment if the manufacturer requires it.

In various embodiments, a device identifier from a communication device is used to track the type and/or quantity of the device being used. By knowing the types and quantities of devices that are being used within a region, the service provider can more accurately manage its inventory. For example, a seller of accessories such as batteries, replaceable covers, or chargers for cellular phones could more accurately predict what accessories should be kept in inventory by knowing how many and what type of cellular phones are being used in a particular area. For example, this information is useful for purchase and inventory management to ensure the right type of the devices and the right quantity of the devices are being purchased. Stated differently, too much inventory of the wrong type of the devices can be costly to the business.

While this invention has been described with specific embodiments thereof, it is evident that many alternatives, modifications and variations will be apparent to those skilled in the art. Accordingly the preferred embodiments of the invention as set forth herein are intended to be illustrative and not limiting. Various changes may be made without departing from the spirit or scope of the invention.

What is claimed is:

1. A method of formatting information for transmission to a communication device, comprising:
   receiving a device identifier from the communication device that identifies a display format for displaying information based on device characteristics of the communication device;
   searching a local database for the display format of the communication device identified by the device identifier;
   if the display format of the communication device is not located, then searching an external database that is accessible via a network interface for the display format of the communication device identified by the device identifier and storing the display format of the communication device in the local database; and
   formatting information to be transmitted to the communication device based on the device identifier.

2. The method of claim 1, further comprising:
   receiving a service identifier from the communication device that identifies at least one service available to a user of the communication device; and
   formatting information to be transmitted to the communication device based on the device and service identifiers.

3. The method of claim 2, further comprising:
   searching a local database for the at least one service available to the user of the communication device identified by the service identifier; and
   if the at least one service available to the user of the communication device is not located, then searching an external database that is accessible via a network interface for the at least one service available to the user of the communication device identified by the service identifier.

4. The method of claim 1, further comprising:
   using a default format to format information to be transmitted to the communication device if the display format of the communication device is not identifiable by the device identifier in the external database.

5. The method of claim 3, further comprising:
   using a default format to format information to be transmitted to the communication device if the at least one service available to the user of the communication device is not identifiable by the service identifier in the external database.

6. The method of claim 1, further comprising:
   using the device identifier to track a type of the communication device that is being used.

7. An apparatus for formatting information for a communication, comprising:
   an interface that receives a device identifier that identifies a display format of a communication device;
   a local database that stores a plurality of display formats of a plurality of communication devices, said local database coupled to the controller; and
   a controller coupled to the interface and to an external database that stores a plurality of display formats of a plurality of communication devices, wherein said controller searches the local database for the display format of the communication device identified by the device identifier and searches the external database that is accessible via a network interface for the display format of the communication device identified by the device identifier if the display format of the communication device is not located in the local database, stores the display format of the communications device in the local database and formats information to be transmitted to the communication device based on the device identifier.

8. The apparatus of claim 7, wherein:
   the interface receives a service identifier that identifies at least one service available to a user of the communication device; and
   the controller formats information to be transmitted to the communication device based on the device and service identifiers.

9. The apparatus of claim 7, wherein:
   the controller formats information to be transmitted to the communication device using a default format if the display format of the communication device is not identifiable by the device identifier in the external database.

10. The apparatus of claim 7, wherein: if the display format of the communication device is not identifiable by the device identifier in the external database, the controller requests additional information from the communication device about display formats of the communication device; and after receiving a response from the communication device, formats information to be transmitted to the communication device according to the additional information provided by the communication device.

11. The apparatus of claim 7, further comprising:
    a local database that stores a plurality of services available to users of communication devices, said local database coupled to the controller; and
    whereby the controller searches the local database for the at least one service available to the user of the communication device identified by the service identifier.

12. The apparatus of claim 7, wherein:
    the controller is further coupled to an external database that is accessible via a network interface and stores a plurality of services available to users of communication devices; and
    the controller searches the external database for the at least one service available to the user of the communication device identified by the service identifier if the at least one service available to the user of the communication device is not located in the local database.

13. The apparatus of claim 12, wherein:
the controller formats information to be transmitted to the communication device using a default format if the at least one service available to the user of the communication device is not identifiable by the service identifier in the external database.

14. The apparatus of claim 7, wherein the apparatus is a server.

15. A system for formatting information for a communication, comprising:
   a wireless network;
   at least one wireless communication device coupled to the wireless network, the communication device adapted to send through the wireless network,
   a first identifier that identifies of a communication device; and
   a second identifier that identifies at least one service available to a user of the communication device; and
   a server coupled to the wireless network, the server including,
   an interface that receives the first identifier and the second identifier; and
   a controller that is operatively connected to a local database and an external database that is accessible to the controller via a network interface, wherein the controller:
   searches the local database for the at least one physical property of the communication device identified by the first identifier;
   searches the external database for the at least one physical property of the communication device identified by the first identifier if the at least one physical property of the communication device is not located in the local database and stores the at least one physical property of the communications device in the local database; and
   formats information to be sent to the wireless communication device based on the physical property of the wireless communication device identified by the first identifier and the service available to the user of the wireless communication device identified by the second identifier.

16. A mobile communication device, comprising:
   an antenna;
   a transceiver coupled to said antenna for transmitting to, and receiving transmissions from, a wireless network;
   a processor coupled to the transceiver; and
   a display for displaying information to a user;
   wherein said processor is programmed to receive a request for a device identifier, respond to the device identifier request by providing the device identifier to the wireless network via the transceiver, receive information formatted in accordance with the provided device identifier, and provide the received information to the display, receive a request for information about the physical properties or capabilities of the mobile communication device, automatically respond to the request by providing the requested information to the wireless network via the transceiver, receive information formatted in accordance with the requested information, and provide the received information to the display.

17. The mobile communication device of claim 16, wherein said device identifier is an International Mobile Equipment Identity.

18. The mobile communication device of claim 16, wherein said device identifier is an Electronic Serial Number.

19. The mobile communication device of claim 16, wherein the requested information provided by the mobile communication device is at least one from the group of processor speed, sound, communication rate, memory, display type, display resolution, mobile communication device operating system, and currently loaded software.

* * * * *